United States Patent
Zeh et al.

(10) Patent No.: US 8,368,420 B2
(45) Date of Patent: Feb. 5, 2013

(54) METHOD OF ERROR DETECTION WHEN CONTROLLING A ROTATING-FIELD MOTOR

(75) Inventors: Stefan Zeh, Wangen (DE); Nicola-Valeriu Olarescu, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 318 days.

(21) Appl. No.: 12/776,641

(22) Filed: May 10, 2010

(65) Prior Publication Data
US 2010/0283500 A1 Nov. 11, 2010

(30) Foreign Application Priority Data
May 8, 2009 (DE) .................... 10 2009 020 473

(51) Int. Cl.
*G01R 31/34* (2006.01)
*G01R 31/40* (2006.01)
(52) U.S. Cl. .................... 324/765.01; 324/764.01
(58) Field of Classification Search .......... 324/765.01, 324/762.01–762.1, 764.01; 318/717, 434
See application file for complete search history.

(56) References Cited

U.S. PATENT DOCUMENTS 6,498,449 B1* 12/2002 Chen et al. .................. 318/434
7,595,603 B2* 9/2009 Zeh .............................. 318/717

FOREIGN PATENT DOCUMENTS

| AT | 409 906 B | 12/2002 |
|----|-----------|---------|
| AT | 412 248 B | 11/2004 |
| DE | 10 2008 017 900 A1 | 10/2009 |

* cited by examiner

*Primary Examiner* — Tung X Nguyen
(74) *Attorney, Agent, or Firm* — Laurence A. Greenberg; Werner H. Stemer; Ralph E. Locher

(57) ABSTRACT

A method is specified for fault identification when operating a rotating-field motor by means of a pulse-controlled inverter, wherein electromagnetic state variables of the rotating-field motor are determined by means of a mathematical model in space-vector form, and wherein the pulse-controlled inverter is operated electronically using space-vector variables. In this case, the invention provides that, during the operation of the rotating-field motor, the space vector of an uncontrolled state variable of the rotating-field motor is formed, in that the space vector that is formed is analyzed for a spectral component at twice the frequency of the rotating field, and in that, if the spectral component at twice the frequency is present, a partial turns short is deduced in the stator windings.

12 Claims, 1 Drawing Sheet

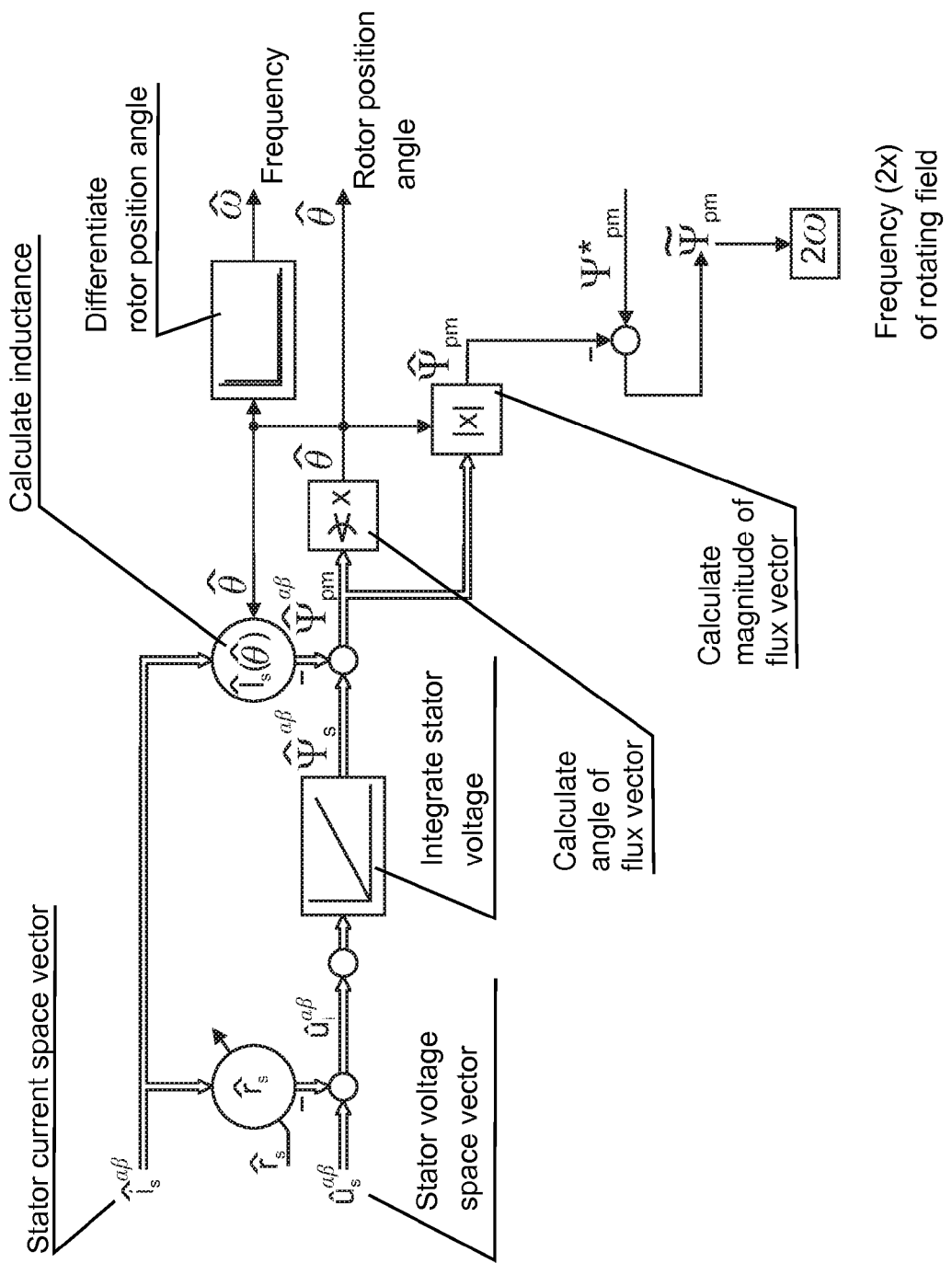

METHOD OF ERROR DETECTION WHEN CONTROLLING A ROTATING-FIELD MOTOR

The invention relates to a method for fault identification when operating a rotating-field motor by means of a pulse-controlled inverter, wherein electromagnetic state variables of the rotating-field motor are determined by means of a mathematical model in space-vector form, and wherein the pulse-controlled inverter is operated electronically using space-vector variables.

It is known per se for a rotating-field motor to be operated with space-vector variables being determined. The method is now being used to control very widely different types of rotating-field motors, in particular such as permanent-magnet electric synchronous motors, electric reluctance motors or electric asynchronous motors, in innumerable applications. In particular, the method is used to operate an electric drum drive in a washing machine.

When a rotating-field motor is operated by means of space vector variables, use is made of the fact that the electromagnetic state variables in a rotating-field motor are described adequately by their magnitude and by their direction on a plane. Therefore, the electromagnetic state variables of a rotating-field motor can each be represented in a suitable two-dimensional coordinate system by a so-called space vector, which is described by its length (magnitude) and by its position (angle). Alternatively, the corresponding components on the axes of the coordinate system can be used to describe it. Mathematical transformation of the state variables which describe the rotating-field motor to a motor-related coordinate system, and in particular to a rotating coordinate system, allow this to be reduced to a direct-current motor for control engineering purposes.

Fundamentally, two different coordinate systems are used to control a rotating-field motor by means of space vector variables. The stator-fixed coordinate system, whose axes are annotated $\alpha$ and $\beta$, is firmly connected to the stator of the rotating-field motor, and is stationary. The electromagnetic space vector variables rotate about the origin at the frequency of the rotating field in this coordinate system. The terminal voltages, that is to say the voltages which are applied between the individual phases or electrical supply lines of the motor, are vectorially added to form a rotating stator voltage space vector. The space vector of the stator flux linkage, which results from the terminal voltage, rotates in the $\alpha$, $\beta$ coordinate system corresponding to the stator voltage space vector.

The field-oriented coordinate system, whose axes are annotated d and q, rotate with the space vector of the flux linkage of the rotor flux and stator winding, which is also referred to, for short, as the rotor flux linkage. To this extent, this coordinate system is directed at the magnetic field which passes through the rotor. It rotates at the same frequency as the voltage fed in, and the frequency of the stator voltage space vector. In this coordinate system, the electromagnetic variables of the rotating-field motor are constant variables, that is to say their coordinates do not have a sinusoidal profile.

In order to operate the pulse-controlled inverter, which produces the individual phase or terminal voltages in the electrical supply lines to the motor, the desired stator voltage space vector is converted, for example, by means of an appropriate mathematic model, which includes characteristic variables of the motor, to the phase or terminal voltages, and the pulse-controlled inverter is operated as appropriate for voltage control. Conversely, of course, the phase voltages can also be converted to the stator voltage space vector.

The use of the described coordinate systems and therefore the use of the space vector variables for operating a rotating-field motor makes it possible, in particular, to manage without a tachogenerator or a rotation speed sensor. This is because the position of the space vector of the rotor flux linkage can be determined by suitable mathematical conversion, and the rotation speed and angular position of the rotating-field motor can be deduced from this. All that is required to do this is to determine the phase currents and the phase or terminal voltages. In this case, the phase voltages and the stator voltage space vector which results from them are already known in the system, since these variables are used to operate the pulse-controlled inverter, with the assistance of the mathematical model that is implemented. In other words, the described operation with the assistance of the space vector variables is suitable for open-loop or closed-loop control of a rotating-field motor without any sensors except for current and possibly voltage sensors.

A partial turns short in the stator of a rotating-field motor which can occur, for example, because of faulty insulation on the winding wires, represents a serious, safety-relevant problem. Particularly in the case of a drive motor for the drum drive of a washing machine, which is operated at high rotation speeds in a speed variation by field control range, the currents which flow in a short-circuited winding are so high that the short-circuited winding is severely overheated, and there is a risk of the motor being set on fire.

It is therefore of major interest to be able to identify a partial turns short even while a rotating-field motor is being operated. In this context, AT 412 248 B teaches the said operating method for a rotating-field motor using space vector variables being used without the use of additional sensors. According to AT 412 248 B, the stator current space vector is on the one hand simulated by computation, by means of the implemented mathematical model, and on the other hand is measured using existing current sensors, in order to diagnose a partial turns short. The spatial profile of the difference formed is then considered. Load fluctuations in the drive directly affect the stator current space vector, however, and can disadvantageously to this extent lead to an incorrect positive fault diagnosis. Furthermore, the stated method is insensitive to low currents.

Furthermore, AT 409 906 B also teaches the use of the operating method by means of space vector variables in order to identify a partial turns short, without any additional sensors being required. In this case, the times for which specific switching states of the pulse-controlled inverter are switched on are monitored during operation of the rotating-field motor. In particular, a check is carried out to determine whether the times for which the active switching states are switched on are distributed uniformly between the six active switching states of the pulse-controlled inverter. An asymmetric distribution is interpreted as an indication of asymmetry in the motor, in particular of a partial turns short. Disadvantageously, even in the case of this method as described in AT 409 906 B for identification of a partial turns short, load fluctuations in the drive can lead to a false positive fault diagnosis.

The object of the invention is to specify a method of the type mentioned initially which allows a partial turns short in the stator windings of the rotating-field motor to be identified as reliably as possible during operation, without any additional sensors.

According to the invention, this object is achieved by a method having the combination of features according to claim 1.

A method for fault identification is accordingly indicated for operation of a rotating-field motor by means of a pulse-controlled inverter, wherein electromagnetic state variables of the rotating-field motor are transformed by means of a mathematical model to space vector variables, and wherein the pulse-controlled inverter is operated electronically in accordance with the space vector variables, wherein the space vector of an uncontrolled state variable of the rotating-field motor is formed during the operation of the rotating-field motor, wherein the space vector that is formed is analyzed for a spectral component at twice the frequency of the rotating field, and wherein a partial turns short in the stator windings is deduced if the spectral component at twice the frequency is present.

A first step of the invention is in this case based on the discovery that a partial turns short in the stator windings in its own right leads to an asymmetry of the electromagnetic state variables of the rotating-field motor. Such an asymmetry can be determined from an uncontrolled state variable of the rotating-field motor. In the case of a controlled state variable, that is to say a state variable which is subject to closed-loop or open-loop control, the asymmetry is smoothed and cannot be seen. For example, if current regulation is provided for the rotating-field motor, then the asymmetry can be identified in the terminal voltages, but not in the phase currents.

A second step of the invention is based on the idea that the space vector of the flux linkage of the rotor flux and stator winding in the stator-fixed coordinate system rotates with a constant magnitude corresponding to the frequency of the stator voltage vector, which is predetermined via the pulse-controlled inverter. In the event of a partial turns short, the trajectory of the space vector of the flux linkage changes from a central circle to an ellipse. Asymmetry at twice the frequency of the rotating field is applied to the space vector of the flux linkage. In the event of a partial turns short, the flux linkage of the rotor flux and stator winding to this extent fluctuates at twice the frequency of the rotating field. The derivative of this flux linkage therefore also fluctuates, specifically the induced voltage, which is also referred to as the electromotive force. In consequence, virtually all electromagnetic state variables in the rotating-field motor have a significant spectral component at twice the field frequency, that is to say at twice the fundamental frequency of the rotating system, in the event of operation with a partial turns short.

Finally, a third step of the invention is based on the idea that, when operation is carried out as described by means of space vector variables, these are present in any case in the control system which means that a partial turns short can be deduced during operation of the rotating-field motor by analysis of the space vector variables formed for a spectral component at twice the frequency of the rotating field, without any additional sensor complexity.

The invention is not restricted to the use of specific state variables of the rotating-field motor. In particular, the stator current space vector, the stator voltage space vector, the space vector of the flux linkage of the rotor flux and stator winding (for short: rotor flux linkage) or the space vector of the electromotive force as a derivative thereof can be used equally well for analysis for the spectral component that is sought. The choice of one of these variables is dependent in particular on the rotating-field motor to be controlled and on the specific operating method used.

By way of example, in order to carry out the method, the space vector of the state variable to be considered is formed from determined actual variables or from variables known from the operating system, in particular such as the phase currents or the selected phase voltages, by means of the implemented mathematical model, and is analyzed for the presence of a spectral component at twice the frequency of the rotating field, in order to detect a partial turns short. The invention is not restricted to specific analysis of the space vector for the spectral component that is sought. In principle, various known methods can be used for this purpose. For example, a Fourier transformation can be used for analysis, from which the component and magnitude of the component at twice the frequency of the fundamental frequency can be seen. A bandpass filter, which is implemented in particular electronically or in circuitry, is preferably used, which can pass on the component at twice the fundamental frequency. A filter such as this can be implemented electronically by suitable computation rules in a microcomputer, which is present in any case, for the operating system or the like.

It is likewise irrelevant to the invention which coordinate system or reference system is used to analyze the space vector for the presence of the spectral component at twice the frequency. The magnitude of the space vector is preferably investigated for the spectral component at twice the fundamental frequency. In one development, in this case, the magnitude is analyzed by means of a Fourier analysis at twice the fundamental frequency. Even if the control method is implemented considering the space coordinates of the space vector in the respective coordinate system, the magnitude can be determined easily.

As mentioned, the method for operating a rotating-field motor using space vector variables can be used in particular for so-called control without sensors, that is to say without a tachogenerator. In the case of a method such as this, the stator current space vector or the stator voltage space vector is respectively formed from the known or measured phase currents and phase voltages or terminal voltages.

As can be seen from an exemplary consideration of the stator voltage equation of a permanent-magnet synchronous motor:

$$e = u - ri - l\frac{di}{dt},$$

where e is the space vector of the electromotive force, u is the stator voltage space vector, i is the stator current space vector, r is the resistance of the stator winding and l is the inductance of the stator windings, all the variables are known in order to determine the space vector of the electromotive force for the given rotating-field motor during operation. The resistance r of the stator windings can expediently be determined when the rotating-field motor is stationary by application of a DC voltage and calculation using the direct current measured in this case. The inductance of the stator winding can likewise expediently be determined with the motor stationary, using a suitable voltage pulse and dynamic evaluation of the current response. The stator voltage space vector u is also known within the operating system. The stator current space vector i is determined by measurement of the phase currents and corresponding conversion to the space vector variable. The position of the space vector of the electromotive force can be used to deduce the rotor position, thus allowing the rotating-field motor to be operated without a tachogenerator.

As can be seen from the stator voltage equation, differentiation over the stator current space vector is required in order to determine the space vector of the electromotive force. Since, as is known, numerical differentiation leads to relatively large errors in the output variable, the space vector of the flux linkage of the rotor flux and stator winding is preferably used for operating the rotating-field motor, and this can be determined by integration over the space vector of the electromotive force. The space vector of the flux linkage Ψ of the rotor flux and stator winding is then obtained as follows:

$$\Psi = \int (u - ri) dt - li.$$

When a rotating-field motor is being operated "without sensors", the space vector of the electromotive force and/or the space vector of the flux linkage of the rotor flux and stator winding are therefore known on a system-inherent basis. They are formed during operation, within the mathematical model.

The space vector of the electromotive force or the space vector of the flux linkage of the rotor flux and stator winding is therefore preferably formed and analyzed in order to analyze the described spectral component at twice the fundamental frequency. To this extent, only one additional analysis step is required in the described operating method in order to determine the partial turns short.

In one development relating to this, the space vector of the entire stator flux, that is to say of the flux linkage of the rotor flux and stator winding including any stator stray flux, is formed and analyzed. This takes account of the magnetic stray flux which results from the actual arrangement of the stator windings and contributes nothing to the magnetic coupling of the windings.

If the space vector of the electromotive force is used for analysis, its magnitude is advantageously formed, and this is divided by the instantaneous rotation speed of the rotating-field motor. This eliminates the relationship between the magnitude of the space vector of the electromotive force and the rotation speed.

In a further preferred refinement of the invention, the space coordinates of the space vector under consideration are analyzed for the spectral component at twice the frequency of the rotating field, with the two coordinates of the space vector to be analyzed being subjected to a Fourier test at twice the fundamental frequency. The physical position of the partial turns short can be deduced directly by Fourier analysis of the spectral component at twice the fundamental frequency. The major axes of the elliptical trajectory can be seen.

Both the rotating-field motor and the pulse-controlled inverter may intrinsically already have existing asymmetry which is represented as deformation of the trajectories of the space vector variables. Therefore, expediently, any system-inherent asymmetry is taken into account in the analysis for the presence of the spectral component at twice the frequency. This improves the sensitivity of the method for fault identification. In particular, the asymmetry can be determined on the sound system comprising the pulse-controlled inverter and the rotating-field motor, and can be mathematically eliminated when carrying out the method for fault identification.

In a further advantageous refinement, the amplitude of the spectral component under consideration is determined, and is related to a nominal value. If, for example, the amplitude obtained for the spectral component under consideration at twice the frequency of the rotating field in the case of the rotor flux linkage or in the case of the electromotive force is related to the respective nominal value, the analysis becomes more accurate and virtually indicates the proportion of the short-circuited turns with respect to the total number of turns when the rotating-field motor is running on no load. A more-improved method is obtained when, particularly in the case of an asynchronous motor, the amplitude of the spectral component obtained at twice the frequency of the flux linkage of the rotor flux and stator winding is related to the total stator flux. This results in the criterion of the presence of the spectral component at twice the frequency being essentially independent of the current.

In a further preferred refinement of the invention, the exceeding of a predetermined or predeterminable threshold value is used as the criterion for the presence of the spectral component at twice the frequency of the rotating field. When the respective variable of the analyzed spectral component under consideration exceeds the threshold value, a partial turns short is identified and, if appropriate, an appropriate fault signal or appropriate information is output. In order to prevent motor damage, the motor can also be stopped, or can continue to be operated at reduced power, if the threshold value is exceeded.

The determined space vector is advantageously also investigated for asymmetries, with the asymmetries that are found being used to deduce asymmetries in the apparatuses for determination of the electrical actual variables and/or the voltage controller of the pulse-controlled inverter. Since the simulated space vectors depend on the installed measurement devices for currents or voltages, asymmetries in the current measurement or asymmetries in the voltage measurement are likewise mapped onto the determined space vectors. If the nominal voltage as set by the pulse-controlled inverter is used to form the space vector, the determined space vector in particular maps the asymmetries of the voltage controller of the pulse-controlled inverter.

One exemplary embodiment of the invention will be explained in more detail with reference to a drawing. In this case, the single FIGURE, FIG. 1, schematically illustrates a control method "without sensors" for operating a rotating-field motor using space vector variables.

In the operating process illustrated in FIG. 1, the stator voltage equation is integrated in order to detect the rotor position of the rotating-field motor. The space vector of the flux linkage of the rotor voltage and stator winding is accordingly formed with the assistance of a mathematical model. The stator current space vector $\hat{i}^{\alpha\beta}_s$ as well as the stator voltage space vector $\hat{u}^{\alpha\beta}_s$ in the stator-fixed coordinate system are used as input variables. That stator current space vector $\hat{i}^{\alpha\beta}_s$ is in this case determined from measured phase currents. The stator voltage space vector $\hat{u}^{\alpha\beta}_s$ is obtained from the selected phase voltages of the pulse-controlled inverter.

In a first step, the known resistance $\hat{r}_s$ of the stator windings is used to form the difference between the stator voltage space vector $\hat{u}^{\alpha\beta}_s$ and the voltage $\hat{i}^{\alpha\beta}_s \hat{r}_s$ dropped across the resistance. Numerical integration is then carried out over the resultant variable $\hat{u}_i^{\alpha\beta}$, thus resulting in the space vector of the stator flux linkage $\hat{\psi}_i^{\alpha\beta}$. Taking account of the self-inductance, which is obtained by multiplying the inductance $\hat{L}_s(\hat{\theta})$ by the stator current space vector $\hat{i}^{\alpha\beta}_s$ the flux linkage of the rotor flux and stator winding $\hat{\Psi}_{pm}^{\alpha\beta}$ is finally determined, in a further step. The instantaneous angle $\hat{\theta}$ can be deduced from this, and is used to operate the rotating-field motor. The frequency $\hat{\omega}$ of the rotor and of the frequency of the rotating field, can be determined from this by differentiation. The rotor position angle $\hat{\theta}$ is at the same time the input for determining the inductance $\hat{L}_s(\hat{\theta})$ since the inductance may be dependent on the rotor position.

Finally, the scalar $\hat{\Psi}_{pm}$ is determined by forming the magnitude of the space vector $\hat{\Psi}_{pm}^{\alpha\beta}$. The error $\tilde{\Psi}_{pm}$ is formed by formation of the difference between the scalar $\hat{\Psi}_{pm}$ and the nominal flux $\hat{\Psi}^*_{pm}$, which in the case of a permanent-magnet synchronous motor, indicates the magnetic flux of the permanent magnets in the rotor. The scalar variable $\tilde{\Psi}_{pm}$ formed is analyzed for the presence of a spectral component at twice the frequency 2 ω of the rotating field. If the value of the determined spectral component exceeds a predetermined limit value, then the presence of a partial turns short is deduced from this.

The invention claimed is:

1. A method for fault identification when operating a rotating-field motor by way of a pulse-controlled inverter, the method which comprises:
   determining electromagnetic state variables of the rotating-field motor by means of a mathematical model in space-vector form with space vectors;
   electronically controlling the pulse-controlled inverter using the space vectors; and
   during an operation of the rotating-field motor, forming a given space vector of an uncontrolled electromagnetic state variable of the rotating-field motor, analyzing the given space vector for a spectral component at twice a frequency of the rotating field, and, if the spectral component at twice the frequency of the rotating field is present, deducing that a partial turns short exists in the stator windings.

2. The method according to claim 1, which comprises analyzing the space vector by way of a bandpass filter for the presence of the spectral component at twice the frequency.

3. The method according to claim 1, which comprises analyzing the magnitude of the space vector for the presence of the spectral component at twice the frequency by way of a Fourier transformation.

4. The method according to claim 1, which comprises forming and analyzing the space vector of a flux linkage of a rotor flux and stator winding or forming and analyzing the space vector of the electromotive force.

5. The method according to claim 1, which comprises forming an analyzing the space vector of an entire stator flux including a flux linkage of a rotor flux and stator winding and any stator stray flux.

6. The method according to claim 1, which comprises forming the magnitude of the space vector of the electromotive force and, before further analysis, dividing the magnitude by an instantaneous rotation speed of the rotating-field motor.

7. The method according to claim 1, which comprises operating the rotating-field motor by controlling the phase currents or the phase voltages and, when the phase currents are controlled, forming and analyzing the space vector of the stator voltage, and, when the phase voltages are controlled, forming and analyzing the space vector of the stator current.

8. The method according to claim 1, which comprises determining variables including phase currents, phase voltages, and a resistance and an inductance of the stator windings, and using the variables to form the space vector to be analyzed.

9. The method according to claim 1, which comprises analyzing space coordinates of the space vector for the spectral component at twice the frequency of the rotating field, subjecting the analyzed spectral component of the space coordinates to a Fourier analysis, and deducing therefrom a physical position of a partial turns short.

10. The method according to claim 1, which comprises taking into account any system-inherent asymmetry in the analysis for the presence of the spectral component at twice the frequency.

11. The method according to claim 1, which comprises determining an amplitude of the spectral component, and relating the amplitude to a nominal value.

12. The method according to claim 1, which comprises additionally investigating the determined space vector for asymmetries, and using asymmetries thus found to deduce asymmetries of a measurement device for determining electrical variables and/or of a voltage controller for the pulse-controlled inverter.

* * * * *